Oct. 10, 1967   P. SINGLETON   3,345,851
MANDREL ATTACHMENTS FOR METAL TUBE EXTRUSION PRESSES
Filed Jan. 6, 1965   2 Sheets-Sheet 1
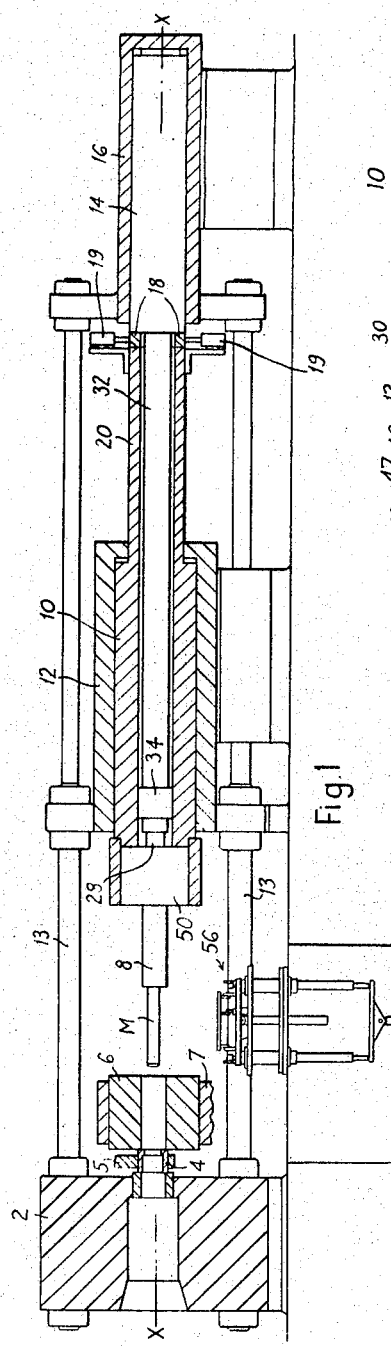
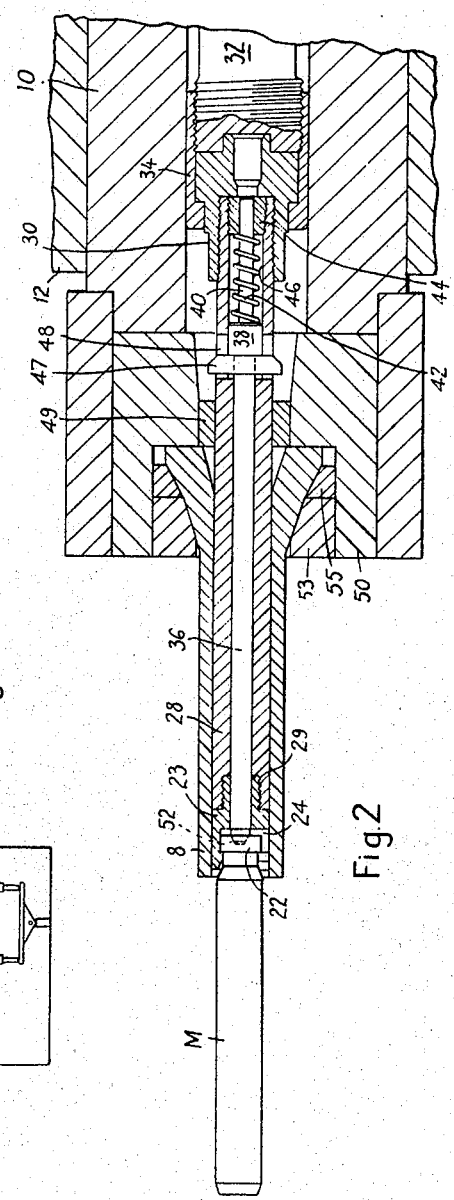
*Inventor*
PETER SINGLETON
By Hammond & Littell
*Attorneys*

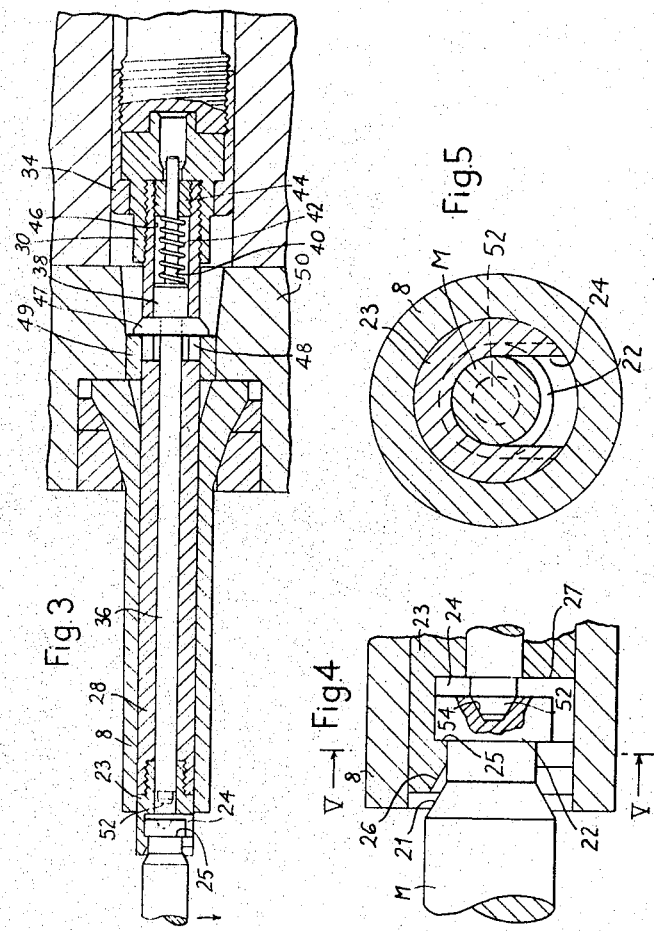

ial alignment therewith is a further cylin-

United States Patent Office 3,345,851
Patented Oct. 10, 1967

3,345,851
MANDREL ATTACHMENTS FOR METAL TUBE EXTRUSION PRESSES
Peter Singleton, West Moors, Dorset, England, assignor to The Loewy Engineering Company, Limited, Bournemouth, England, a company of Great Britain
Filed Jan. 6, 1965, Ser. No. 423,773
Claims priority, application Great Britain, Jan. 10, 1964, 1,156/64
13 Claims. (Cl. 72—253)

ABSTRACT OF THE DISCLOSURE

Metal tube extrusion presses of the type in which a mandrel unit has separate means for its reciprocation and which is provided with means for coupling and uncoupling the mandrel from the mandrel holder in a rapid and simple manner.

---

This invention relates to metal tube extrusion presses having separate mandrel units. Such a unit includes generally the mandrel itself, a holder for the mandrel, and a shaft connecting that holder to a reciprocable element of a hydraulic unit for moving the mandrel through the hot billets prior to their extrusion.

A mandrel and its holder are usually secured to each other by being screwed together, or by other connections.

During the operation of an extrusion press, the mandrels frequently reach high temperatures through their contact with the heated billets. When the billet temperatures are in the order of 1,000° C. or more, as is the case with steel billets, and when the extrusion operations follow each other in quick succession, the mandrel temperature can become so high as to make a mandrel unfit for further use after only a few operations. Under these conditions, mandrels have to be changed very often, sometimes after each extrusion operation. It is desirable that only the mandrel, and not its holder, is exchanged. This means that coupling and uncoupling of mandrel and holder must take place in the press. It then becomes important to provide means in the press which permit rapid coupling and uncoupling of mandrel and holder while they are both in the press axis.

It is an object of the present invention to provide a metal tube extrusion press having a separate mandrel unit, with means for coupling and uncoupling a mandrel and its holder in a simple maner, which, at the same time, ensures that the mandrel, when coupled, is firmly held in position.

It is a further object of the present invention to provide a metal tube extrusion press having a separate mandrel unit with means which permit coupling and uncoupling of a mandrel and its holder without necessitating any rotation of mandrel or holder during coupling or uncoupling.

In its broadest aspect, the invention consists in providing in a metal tube extrusion press with a separate mandrel unit, a mandrel having an enlarged head, a mandrel-holder formed at its forward end as a coupling for said mandrel and having at that end a cavity into which the mandrel head can be entered by moving the mandrel radially with respect to the mandrel-holder axis, and means for urging said mandrel head into endwise engagement with a part on the coupling which projects into the cavity in front of the mandrel head. By applying sufficient pressure to the mandrel head, it can be ensured that the mandrel is firmly held in position in relation to the coupling during all stages of an extrusion operation.

The means acting on the mandrel head may comprise a rod which is movable relative to the mandrel-holder by spring or by hydraulic pressure and engages the mandrel head.

An embodiment of the invention will now be described by way of example with reference to the accompanying drawings, in which:

FIG. 1 is a side elevation of a metal tube extrusion press according to the invention, partly in section and showing in a somewhat diagrammatic manner the arrangement of a mandrel unit in that press.

FIG. 2 is a sectional side elevation on an enlarged scale showing the mandrel unit, with the mandrel coupled to its holder.

FIG. 3 is a sectional side elevation similar to that of FIG. 2, but with mandrel and holder uncoupled.

FIG. 4 is a sectional side elevation on a still further enlarged scale of the coupling provided between mandrel and mandrel-holder.

FIG. 5 is a section along the line V—V of FIG. 4.

The metal tube extrusion press of FIG. 1 is of the horizontal type and comprises a main platen 2 and a main cylinder 12, both connected to each other by columns 13. Arranged in the main axis X—X of the press and in the space between cylinder 12 and platen 2 are a die-assembly 4 and a billet-container 6, both being mounted on rotary carriers 5 and 7 respectively, which are only partly shown. When in their working positions, as illustrated in FIG. 1, the die-assembly 4 is axially supported on the platen 2, and the container 6 on the die-assembly. Means, not shown here, are further provided for moving the carriers 5 and 7 independently of each other in the direction of the axis X—X. More than one die-assembly will usually be mounted on the carrier 5, and more than one container on the carrier 7.

By rotating the carrier 5 about an axis parallel to the axis X—X, the die-assembly 4 is moved out of alignment with the axis X—X to a parking station, where it can be reconditioned or exchanged, while at the same time another die-assembly is moved into its place. Rotation of the carrier 7 about an axis parallel to the axis X—X moves a container 6 out of that axis into a parking station where this container can be reconditioned and loaded with a new billet, while at the same time another container can be moved into its place. The afore-described arrangement of die-assemblies and containers and of their carriers is known in itself and does not form part of the present invention.

The main ram 10 is displaceable in the main cylinder 12, and carries at its end a crosshead 50 to which a hollow pressing stem 8 is secured by such means as rings 53 and 55. Arranged behind the cylinder and at some distance therefrom in axder 16 in which a ram 14 is displaceable. The latter is connected to a shaft 32 which passes through a hollow extension 20 of the main ram and through the hollow main ram itself. At its forward end, the shaft 32 is coupled by a sleeve 34 to a connector 30 which is screwed on to the rear end of a hollow mandrel-holder 28. The mandrel-holder extends forwardly through the crosshead 50 and the pressing stem 8, and carries at its forward end a coupling 23 for the mandrel M.

Referring now to FIGS. 2 to 5, an actuating rod 36 with a conical tip 52 extends through the length of the mandrel-holder 28 and is accommodated in its bore. The rod protrudes with its tip 52 only a short distance out of the face 27 of coupling 23, and is guided and supported in that coupling for most of its length. Near its rear, the rod 36 is formed with a transverse stop-bar 47 which enters slots 48 in the mandrel-holder 28 and thereby limits the relative axial movement between rod 36 and mandrel-holder 28. Adjacent the bar 47 is a shoulder 38 on the rod 36 which forms an abutment for a spring 42, the latter encircling an extension 40 of the rod 36. The other abutment for the spring 42 is formed by a plug 44 screwed into the rear end of the mandrel-holder 28.

Coupling 23 is screwed on to the mandrel-holder 28 at 29 and has at its forward end a cavity 24. The coupling 23 has for most of its length the cross-section of a horseshoe, so that the cavity 24 is open at its bottom. The front end of the coupling 23 has a turned-in flange 25 which, at its front, is in the shape of a cone 26. The cavity 24 is closed at its rear by an end-wall 27 of the coupling 23.

The mandrel M is fromed at its rear end with a conical part 21 having the same angle of inclination as the cone 26 of the coupling 23. Joined to the section 21 is a short shank of reduced diameter and a head 22 of somewhat larger diameter than the main part of the mandrel. The head has at its end-face a conical recess 54 into which tip 52 of the rod 36 fits.

The press is further provided with two gags 18 which, by means of hydraulic cylinders 19, can be advanced radially towards the axis X—X, and thus be entered into spaces between the ram 14 and the extension 20 of ram 10, whereby the two rams are coupled to each other.

A mandrel-transfer gear 56 shown diagrammatically in FIG. 1 is arranged in the lower part of the press and in such a position that the mandrel M, when retracted out of the container 6, is ready to be received by that transfer gear. A preferred form of a mandrel-transfer gear is described in our co-pending British patent application No. 5,347/64.

Prior to an extrusion operation, a mandrel M is coupled to the mandrel-holder and therefore in the position shown in FIG. 2. At the beginning of the operation, the gags 18 are entered into the spaces between ram 14 and extension 20. Both rams 10 and 14 can then be advanced simultaneously, together with the pressing stem 8 and the entire mandrel unit, the latter comprising shaft 32, mandrel-holder 28, coupling 23 and mandrel M. The rod 36, being urged forward by pressure of the spring 42 has become seated with its tip 52 in the recess 54 of head 22.

During this advance, a billet in the container 6, if hollow, is traversed by the mandrel, and, if solid, pierced by the latter, whereafter the mandrel enters the aperture in is die-assembly 4, while, at the same time, the pressing stem 8 extrudes the billet from the container through the die. During the movement of the pressing stem, the mandrel moves as well and advances through the opening in the die-assembly 4. At this stage, the head 22 of the mandrel is in firm contact with the in-turned flange 25 of the coupling 23, so that the mandrel is prevented from being carried along and pulled out of the coupling 23 by the outflowing metal.

After extrusion of the billet has been completed, the unextruded billet remainder is severed from the extruded article in the well-known manner by a shear or saw, not shown, and pressing stem 8, as well as mandrel-holder 28, are then retracted by return rams and cylinders, not shown. Return of the mandrel is effected by the contact between the in-turned flange 25 and the head 22 of the mandrel.

For uncoupling of the mandrel M from the mandrel-holder 28, the gags 18 are first withdrawn and thereafter the ram 14 advances a short distance, so that mandrel-holder 28 and coupling 23 are moved into the positions shown in FIG. 3 where they protrude from the pressing stem 8. At this stage, rod 36 moves together with the mandrel-holder 28 until its stop-bar 47 encounters an annular stop 49 provided outside the mandrel-holder in the crosshead 50. Further movement of rod 36 is thus prevented, while movement of mandrel-holder 28 and coupling 23 continues. Thus, the cone 26 of coupling 23 engages with the conical section 21 of mandrel M, carrying the mandrel along the forward direction and thereby disengaging the head 22 of the mandrel from rod 36 (FIG. 3). The mandrel is now free to drop through the opening at the bottom of the cavity 24, to be received by the transfer gear 56. This transfer gear has by this time been raised to a position immediately beneath the mandrel. The transfer gear 56 may then be lowered, the mandrel transferred to a zone for cooling and inspection and any other treatment necessary, and another mandrel loaded on to the transfer gear ready to be inserted into coupling 23. This is done by first entering this mandrel from below into the cavity 24, so that the head 22 is located behind the flange 25. Upon retraction of mandrel-holder 28 and coupling 23 by the means not shown here, the new mandrel M is carried along through the contact between head 22 and flange 25 until the tip 52 of the rod 36 enters the recess 54. Further retraction of the mandrel-holder 28 and mandrel M carriers along the rod 36 whose transverse bar 47 becomes disengaged from the annular stop 49. The parts of the mandrel unit are now back again in the position of FIG. 2 and are thus ready for another extrusion operation.

It will be noted that the mandrel M and the mandrel-holder can be coupled together or uncoupled from each other without necessitating any rotation of either mandrel or holder. For coupling or uncoupling, it is merely necessary to displace the mandrel-holder axially by advance and return means which are provided in any metal tube extrusion press of standard design.

The mandrel, when in the position shown in FIG. 2, is firmly seated in the coupling 23 by the action of the spring-loaded rod 36 which, with its tip 52, enters the recess 54 in the mandrel head 22. Pressure of spring 42 urges head 22 firmly against in-turned flange 25. Thus, mandrel M is firmly attached to coupling 23. As rod 36 protrudes only a short distance from the face 27 of coupling 23, the tip 52 of the rod 36 will not deflect under the weight of the mandrel and there is no risk of the mandrel becoming loose and detaching itself from the coupling.

The press described can also be operated without the gags 18. In this case, pressing stem 8 and mandrel-holder 28 are moved independently of each other by their respective rams 10 and 14.

The invention is capable of variations in detail. It is, for instance, possible to make coupling 23 and mandrel-holder 28 in one piece, although their separation has the advantage of permitting replacement of the coupling 23 independently of the mandrel-holder; this is important if the same coupling is used for mandrels of different size or if the coupling wears more rapidly than the mandrel-holder. The conical part 21 on the mandrel and the cone 26 on coupling 23 may be further omitted, in which case the mandrel is carried along and detached from the rod 36 by the face 27 of the coupling contacting the head 22 during advance of the mandrel-holder. It is also possible, for instance, to replace the coil spring 42 which acts on the rod 36 by a set of Belleville washers or a small separate hydraulic unit. Other variations in detail will occur to those skilled in the art.

I claim:

1. A metal tube extrusion press having a separate mandrel unit comprising a mandrel with an enlarged head, a mandrel-holder formed at its forward end as a coupling for said mandrel and having at that end a cavity into which the mandrel head can be entered by moving the mandrel radially with respect to the mandrel-holder axis, and means for urging said mandrel head into endwise engagement with a part on the coupling which projects into the cavity in front of the mandrel head.

2. A metal tube extrusion press according to claim 1, in which the means acting on the mandrel head comprise a rod which is movable relative to the mandrel-holder by pressure means and engages the mandrel head.

3. A metal tube extrusion press according to claim 2, in which the mandrel-holder is hollow and the rod is arranged inside the hollow mandrel.

4. A metal tube extrusion press according to claim 2, in which the rod is adapted to be carried along by the mandrel-holder with the latter's forward stroke by pressure means, said means being so arranged that they urge the rod into contact with the mandrel head, and the mandrel head in turn into contact with that part of the coupling which projects into the cavity of the coupling in front of the mandrel head.

5. A metal tube extrusion press according to claim 4, in which the movement of the rod together with the mandrel-holder in the forward direction is limited by stop means outside the mandrel-holder.

6. A metal tube extrusion press according to claim 3, in which the rod projects only a short distance out of the coupling part of the mandrel-holder and is adapted to enter with its tip into a recess in the mandrel head.

7. A metal tube extrusion press according to claim 6, in which the tip of the rod and the recess are both conical.

8. A metal tube extrusion press according to claim 1, in which the coupling at the end of the mandrel-holder has for most of its length the cross-section of a horse-shoe through whose opening the mandrel head can enter so as to engage with a part on the coupling projecting into the cavity in front of the mandrel head.

9. A metal tube extrusion press according to claim 8, in which the horse-shoe-shaped coupling part is open at its lower side.

10. A metal tube extrusion press according to claim 8, in which the coupling is formed at its forward end with an in-turned flange which projects into the cavity and against which the mandrel head is urged into endwise engagement by said rod.

11. A metal tube extrusion press according to claim 2, in which said mandrel is adapted to be carried along during the forward stroke of said mandrel head after the forward movement of said rod has been arrested.

12. A metal tube extrusion press according to claim 11, in which said mandrel and said coupling have radially projecting surfaces which are adapted to be moved in endwise engagement with each other when the mandrel-holder and the coupling continue their forward movement after stopping of the rod.

13. A metal tube extrusion press according to claim 1, in which the coupling of the mandrel-holder is formed as a separate part which is detachable from the mandrel-holder.

References Cited

UNITED STATES PATENTS

| | | | |
|---|---|---|---|
| 1,645,428 | 10/1927 | Hosmer | 287—103 |
| 1,712,049 | 5/1929 | Robb | 287—103 |
| 2,793,902 | 5/1957 | Govan | 287—103 |
| 2,810,479 | 10/1957 | Forbes | 72—266 |
| 3,074,549 | 1/1963 | Kent | 72—265 |

CHARLES W. LANHAM, *Primary Examiner.*

K. C. DECKER, *Assistant Examiner.*